United States Patent
Arlinsky

(10) Patent No.: US 6,658,755 B2
(45) Date of Patent: Dec. 9, 2003

(54) MEASURING DEVICE, AND METHOD FOR PROGRAMMING A SOFT FEATURE KEY OF AN ELECTRONIC DEVICE

(75) Inventor: David Arlinsky, Atlit (IL)

(73) Assignee: Yair Nomberg, Modiin (IL); part interest ( * ) Notice: Subject to any disclaimer, the term of this patent is extended or adjusted under 35 U.S.C. 154(b) by 0 days.

(21) Appl. No.: 10/025,482

(22) Filed: Dec. 26, 2001

(65) Prior Publication Data

US 2002/0088135 A1 Jul. 11, 2002

Related U.S. Application Data

(63) Continuation of application No. PCT/IL00/00383, filed on Jul. 3, 2000.

(30) Foreign Application Priority Data

Jul. 8, 1999 (IL) ................................................ 130846
Apr. 10, 2000 (IL) ................................................ 135566

(51) Int. Cl.⁷ ................................................ G01B 3/10
(52) U.S. Cl. ............................ 33/760; 33/763; 33/1 PT
(58) Field of Search ........................ 33/760, 755, 761, 33/762, 763, 769, 1 N, 534; 702/167, 168, 161, 164, 150–152, 155, 157

(56) References Cited

U.S. PATENT DOCUMENTS

| 3,862,761 | A | * | 1/1975 | Conley | 369/69 |
|---|---|---|---|---|---|
| 4,213,035 | A | | 7/1980 | Nobuyasu | |
| 4,551,847 | A | | 11/1985 | Caldwell | |
| 4,658,134 | A | | 4/1987 | Okumura | |
| 4,782,448 | A | * | 11/1988 | Milstein | 705/400 |
| 5,007,176 | A | | 4/1991 | Huang | |
| 5,035,064 | A | * | 7/1991 | Care | 33/760 |
| 5,075,977 | A | | 12/1991 | Rando | |
| 5,230,159 | A | | 7/1993 | Lipsey | |
| 5,396,578 | A | * | 3/1995 | Howes | 704/272 |
| 5,426,863 | A | * | 6/1995 | Biggel | 33/763 |
| 5,433,014 | A | * | 7/1995 | Falk et al. | 33/763 |
| 5,628,120 | A | | 5/1997 | Sergenius | |
| 5,743,021 | A | * | 4/1998 | Corcoran | 33/762 |
| 5,802,732 | A | * | 9/1998 | Malone | 33/768 |
| 5,859,783 | A | * | 1/1999 | Ytterberg et al. | 702/54 |
| 5,894,383 | A | | 4/1999 | Kinjo et al. | |
| 5,894,677 | A | | 4/1999 | Hoffman | |
| 5,983,514 | A | * | 11/1999 | Lindsey | 33/760 |
| RE37,824 | E | * | 9/2002 | Pullen | 242/379 |

OTHER PUBLICATIONS

Texas Instruments, TI–Graph Liknk 2 for the Macintosh: Condensed Guidebook, 1999, Texas Instruments Incorporated.*

Texas instruments, TI–83 Graphing Calculator Guidebook: Chapter 16 and TI–Graph Link, Printed Apr. 3, 2003, from an archived Texas Instruments Webpage, Copyright 1997, pp. i–ix, 16–1–16–22 and 1–3.*

* cited by examiner

Primary Examiner—Diego Gutierrez
Assistant Examiner—Amy R. Cohen
(74) Attorney, Agent, or Firm—Nath & Associates PLLC; Harold L. Novick

(57) ABSTRACT

A measuring device having a tape for taking angle and length measurements, tnd capable of providing a user discernible indication of the angular orientation of its tape relative in any given extended measuring state relative to a predetermined orientation, for example, the horizontal. The measuring device preferably is capable of reading out one or more measurements associated with any given extended measuring state, and transmitting them to a remote device. The measuring device preferably has one or more finger depressible soft feature keys each programmable with a user specified function downloaded from a host computer.

31 Claims, 3 Drawing Sheets

MEASURING DEVICE, AND METHOD FOR PROGRAMMING A SOFT FEATURE KEY OF AN ELECTRONIC DEVICE

This application is a continuation of International Application No. PCT/IL00/00383 with International filing date of Jul. 3. 2000.

FIELD OF THE INVENTION

The invention is in the field of measuring devices in general, measuring devices for measuring angle and/or length measurements in particular, and a method for programming a soft feature key of an electronic device.

BACKGROUND OF THE INVENTION

Craftsmen such as builders, carpenters, plumbers, and the like take angle and/or length measurements during the course of their work which they then use, for example, for selecting an item in accordance with a measured length, cutting an item to a desired length, and the like. Various measuring devices have been proposed in the art including inter alia U.S. Pat. No. 4,213,035 to Washizuka et al, U.S. Pat. No. 4,658,134 to Okumura, U.S. Pat. No. 5,007,176 to Huang, and U.S. Pat. No. 5,628,120 to Serenius to facilitate taking angle and/or length measurements.

Electronic devices are typically designed bearing in mind the different needs of different potential end users often resulting in an extensive array of finger depressible feature keys which increases cost, reduces overall reliability due to equipment failure, etc. Two approaches to reduce the number of feature keys of an electronic device include the provision of pre-set dual function feature keys and/or so called soft feature keys each programmable to support a user specified function selected from a number of pre-set functions assignable thereto.

SUMMARY OF THE INVENTION

The present invention is directed toward the provision of added functionality to electronic devices in general, measuring devices for taking angle and length measurements in particular, and digital tape measures in even greater particularity.

The first aspect of the present invention is directed toward a tape measure with means for providing a user discernible indication of the orientation of its tape in an extended measuring state relative to a predetermined orientation, for example, the horizontal for facilitating the taking of accurate measurements.

The second aspect of the present invention is directed toward a digital tape measure with means for reading out measurements for facilitating the taking of measurements in circumstances which are not conducive to the taking of measurements, for example, when a tape measure is obscured from view, when ambient light conditions are poor, etc.

The third aspect of the present invention is directed toward a digital tape measure with means for transmitting measurements to a remote device thereby precluding the need for their being written down during the course of their being taken.

The fourth and last aspect of the present invention is directed toward the provision of means for customizing an electronic device having one or more finger depressible soft feature key to a user's particular requirements by way of downloading user specified functions from a host computer thereby paving the way for user customization of simpler, cheaper, and more reliable electronic devices in terms of the number of soft feature keys.

BRIEF DESCRIPTION OF THE DRAWINGS

In order to understand the invention and to see how it may be carried out in practice, preferred embodiments will now be described, by way of non-limiting examples only, with reference to the accompanying drawings, in which similar parts are likewise numbered, and in which.

DETAILED DESCRIPTION OF THE DRAWINGS

Figure 1:
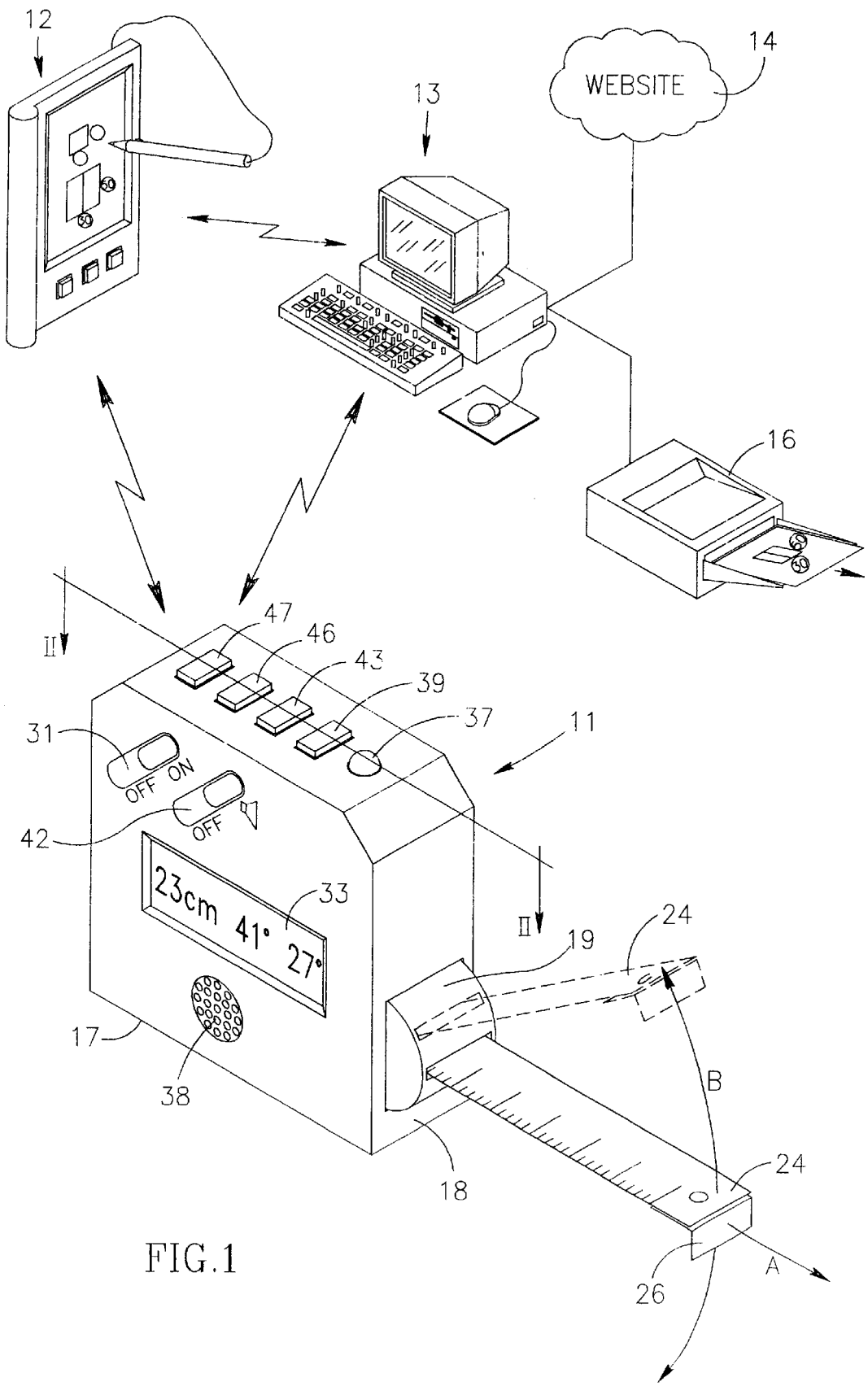
FIG. 1 is a pictorial representation of a digital tape measure in accordance with the present invention for use with a digitizer and a host computer.
Figure 2:
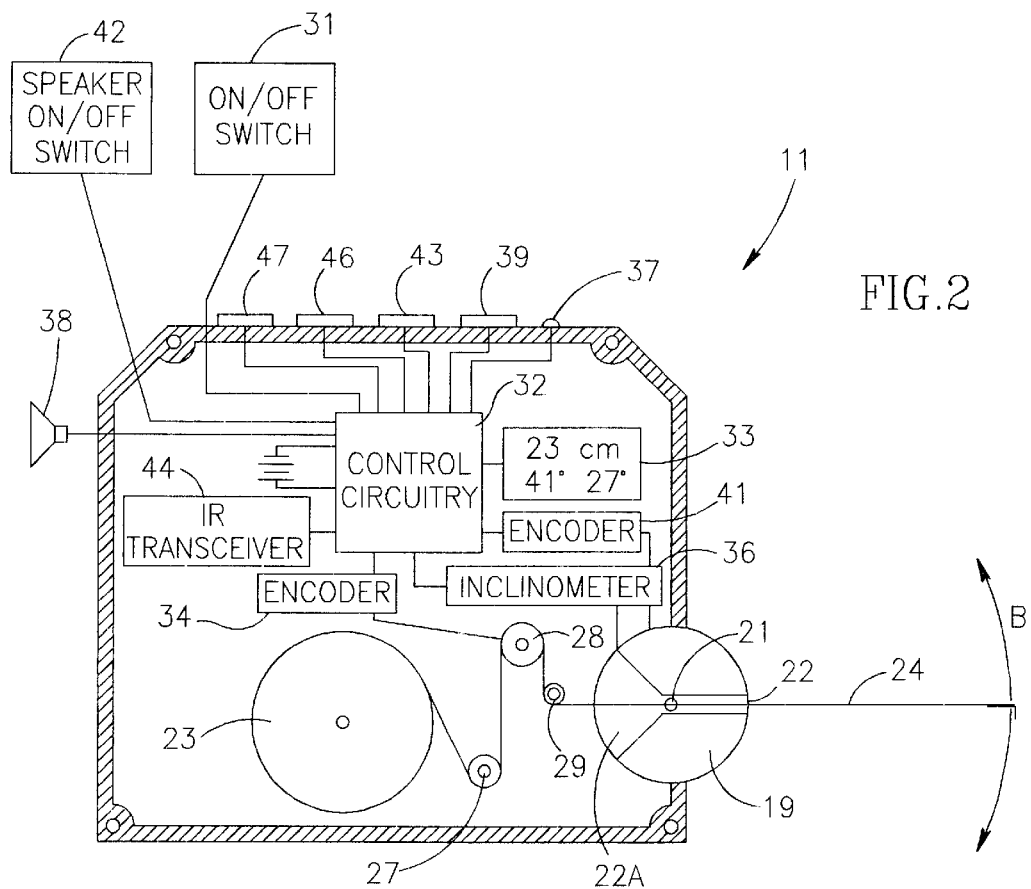
FIG. 2 is a cross section view of the tape measure of FIG. 1 along line II—II.

With reference to FIGS. 1 and 2, there is shown a digital tape measure II for use with a digitizer 12 and a host computer 13 linked up to the Internet 14 and connected to a printer 16. The tape measure 11 includes a handheld portable housing 17 with a side wall 18. The housing 17 accommodates a rotatable member 19 rotatable about an axis of rotation 21, and having a portion protruding from the side wall 18. The rotatable member 19 is formed with a diametrical channel 22 having a trailing portion 22A converging towards the axis of rotation 21. The housing 17 accommodates a spring biased reel 23, and a tape 24 with an end hook 26 and being tractable over three rotatable guide rollers 27, 28 and 29 and through the channel 22 from a normally retracted state wound on the reel 23 to an extended measuring state relative to the housing 17 along a direction of extension A. An angular displacement B of the tape 24 relative to the housing 17 when held stationary causes a concurrent rotation of the rotatable member 19 about its axis of rotation 21. The trailing portion 22A ensures that the direction of the tape 24 extending between the guide roller 29 and the axis of rotation 21 is unaffected by a rotation of the rotatable member 19.

The tape measure 11 includes a slidable ON/OFF button 31, control circuitry 32, and a display 33 having a left display field displaying an exemplary 23 cm length measurement of the extension of the tape 24 relative to the housing, a middle display field displaying an exemplary 41° angle measurement of the angular displacement B of the tape 24 relative to the horizontal, and a right display field displaying an exemplary 27° angle measurement of the angular displacement B of the tape 24 relative to a user determined orientation. The length measurement on the left display field of the display 33 is provided by an encoder 34 measuring the length of tape 24 passing over the guide roller 28 as it is outwardly pulled to its extended measuring state. The angle measurement on the middle display field of the display 33 is provided by an inclinometer 36 measuring the angle of rotation of the rotatable member 19 corresponding to the angular orientation B of the tape 24. The control circuitry 32 can also illuminate a LED 37 and/or issue a series of beeps over a speaker 38 when the tape 24 coincides with the horizontal. The angle measurement on the right display field of the display 33 is provided by an encoder 41 which is set by use of a RESET key 39.

The tape measure 11 includes a slidable SPEAKER ON button 42 and the control circuitry 32 includes speech synthesizing capability for enabling the reading out of values displayed on the display 33 over the speaker 38. The tape measure 11 includes a SEND key 43 for activating an IR transceiver 44 for transmitting information, namely, angle and/or length measurements, to the digitizer 12. The IR transceiver 44 is also employed for receiving user specified functions downloaded from the computer 13 for programming two programmable soft feature keys 46 and 47.

The use of the tape measure 11 is as follows:

A user can initially discern that the direction of extension of the tape coincides with the horizontal (the middle display field reads 0°) or the vertical (the middle display field reads 90°) for displaying an accurate horizontal or vertical length measurement in the left display field. Thereafter, he can angularly displace the tape 24 relative to the housing 17 which is kept stationary for displaying an angular measurement to the horizontal in the middle display field. Alternatively, a user can initially place the tape measure 11 on an inclined surface and press the RESET key 39 for displaying an angular measurement with respect to the inclined surface in the right display field.

The user can use the tape measure 11 to transmit measurements one by one to the digitizer 12 programmed to receive measurements of say the lengths of the sides of an object, for example, a door, a window frame, he has to measure in a clockwise direction starting from 12 o'clock. The measurements are preferably added as graphic items to circles adjacent each side to be measured so that a graphic including the outline of the object together with the measurements can be transmitted to the computer 13 for printing on the printer 16. The user can download functions from the computer 13 to be assigned to the programmable soft feature keys 46 and 47, for example, conversion of meters to inches, storing the last 30 measurements, the adding of two length measurements, etc as selected from an inventory of ready made functions residing on a Website and/or as programmed by himself.

Figure 3A:
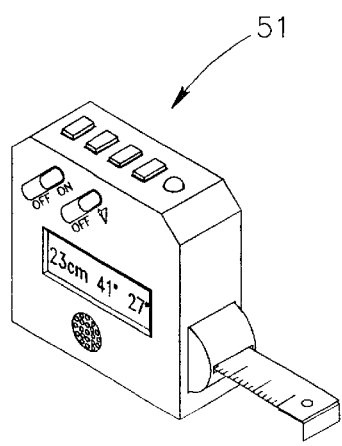
FIG. 3A is a front pictorial representation of a digital tape measure in accordance with the present invention having a digitizer integrally formed therewith.
Figure 3B:
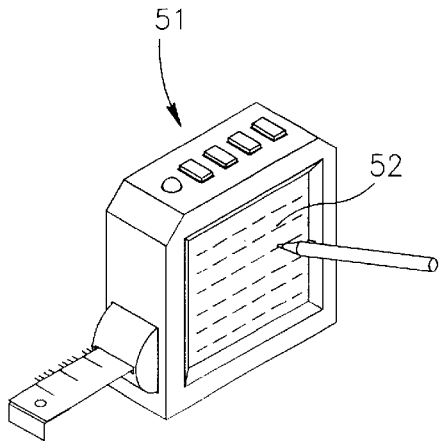
FIG. 3B is a rear pictorial representation of the tape measure of FIG. 3A.

FIGS. 3A and 3B show a measuring device 51 similar to the tape measure 11 except that it is integrally formed with a digitizer 52 whereby the information stored by the measuring device 51 can be directly transmitted to the computer 13 for printing on the printer 16.

Figure 4:
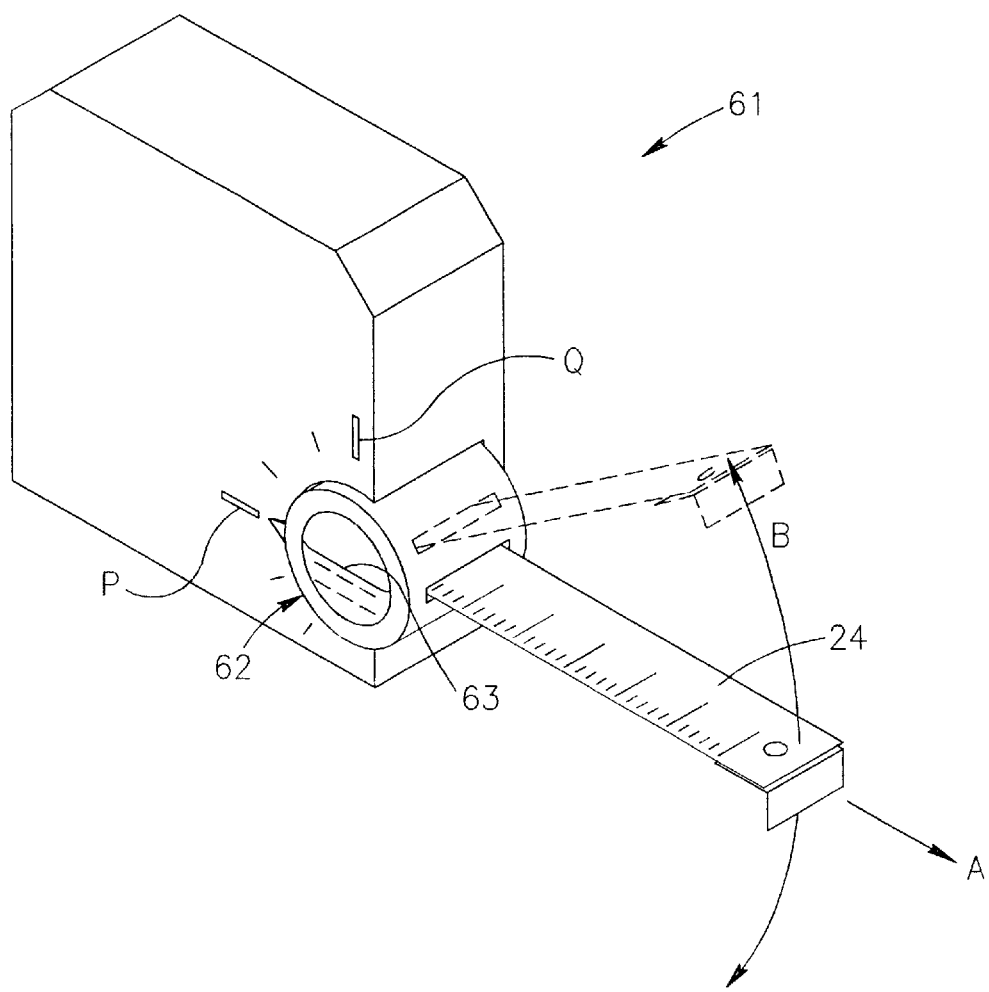
FIG. 4 is a pictorial representation of an analog tape measure in accordance with the present invention.

FIG. 4 shows an analog tape measure 61 similar to the tape measure 11 except that in this case it employs a liquid based spirit level like device 62 for providing a visual user discernible indication. The spirit level like device 62 contains liquid whose meniscus 63 indicates that the tape 24 is horizontal or vertical when in registration with line P and Q, respectively.

While the invention has been described with respect to a limited number of embodiments, it will be appreciated that many variations, modifications and other applications of the invention can be made within the scope of the appended claims. For example, the orientation sensor can be responsive to the rotation of an entire conventional tape measure (constituting a rotatable member) rotatably mounted in a housing. And, the programming of soft feature keys by way of downloading functions from a host computer is equally applicable to a wide range of electronic devices designed for use in the home, the office, the workshop, etc. The IR transceiver can be replaced by other conventional wired or wireless data communication means.

What is claimed is:

1. A measuring device comprising a housing; a tape selectively outwardly tractable from said housing from a normally retracted storage state to an extended measuring state; a rotatable member being rotated about its axis of rotation by an angular displacement of said tape, in said extended measuring state, relative to said housing; and an orientation sensor responsive to said rotation of said rotatable member for providing a user discernible indication of the orientation of said angular displacement of said tape relative to a predetermined orientation.

2. The device according to claim 1 wherein said tape slidingly extends through said rotatable member.

3. The device according to claim 2 wherein said tape slidingly extends through a diametrical channel formed in said rotatable member.

4. The device according to claim 3 wherein said channel has a trailing portion converging towards said axis of rotation in the direction of extension of said tape.

5. The device according to claim 1 wherein said orientation sensor is an inclinometer for providing a user discernible indication of said angular orientation relative to the horizontal.

6. The device according to claim 1 wherein said orientation sensor is an encoder for providing a user discernible indication of said angular orientation relative to a user determined orientation.

7. The device according to claim 1 and further comprising control circuitry with speech synthesizing capability for reading out at least one measurement associated with said extended measuring state.

8. The device according to claim 1 and further comprising data transmitting means for transmitting information including at least one measurement associated with said extended measuring state to a remote device.

9. The device according to claim 8 wherein said information includes a graphic including at least one measurement drawn on a digitizer integrally formed with the measuring device.

10. The device according to claim 1 and further comprising one or more finger depressible soft feature keys each programmable with a user specified function.

11. The device according to claim 1 and further comprising data receiving means for downloading a user specified function from a host computer for assignment to a finger depressible soft feature key.

12. The device according to claim 1 wherein said orientation sensor is a liquid based spirit level like device.

13. A measuring device comprising a housing; a tape selectively outwardly tractable from said housing from a normally retracted storage state to an extended measuring state; measuring means for measuring one or more measurements associated with said extended measuring state and for providing a signal; control circuitry which receives said signal and has speech synthesizing capability for reading out at least one measurement associated with said extended measuring state based on said received signal; and a rotatable member being rotated about its axis of rotation by an angular orientation of said tape, in said extended measuring state, relative to said housing; and an orientation sensor responsive to said rotation of said rotatable member for providing a user discernible indication of said angular orientation of said tape relative to a predetermined orientation.

14. The device according to claim 13 wherein said tape slidingly extends through said rotatble member.

15. The device according to claim 14 wherein said tape slidingly extends through a diametric channel formed in said rotatable member.

16. The device according to claim 15 wherein said channel has a trailing portion converging towards said axis of rotation in the direction of extension of said tape.

17. The device according to claim 13 wherein said orientation sensor is an inclinometer for providing a user discernible indication of said angular orientation relative to the horizontal.

18. The device according to claims 13 wherein said orientation sensor is an encoder for providing a user discernible indication of the orientation of said tape relative to a user determined orientation.

19. The device according to claim 13 and further comprising data transmitting means for transmitting information including at least one measurement associated with said extended measuring state to a remote device.

20. The device according to claim 19 wherein said information includes a graphic including at least one measurement drawn on a digitizer integrally formed with the measuring device.

21. The device according to claim 13 and further comprising one or more finger depressible soft feature keys each programmable with a user specified function.

22. The device according to claim 21 and further comprising data receiving means for downloading a user specified function from a host computer for assignment to a finger depressible soft feature key.

23. A measuring device comprising:
    a housing;
    a tape selectively outwardly tractable from said housing from a normally retracted storage state to an extended measuring state;
    measuring means for measuring at least one measurement associated with said extended measuring state; and a digitizer integrally formed in said housing for receiving said measurement from said measuring means;
    a rotatable member being rotated about its axis of rotation by an angular displacement of said tape, in said extended measuring state, relative to said housing; and
    an orientation sensor responsive to said rotation of said rotatable member for providing a user discernible indication of said angular orientation of said tape relative to a predetermined orientation.

24. The device according to claim 23 wherein said tape slidingly extends through said rotatable member.

25. The device according to claim 24 wherein said tape slidingly extends through a diametric channel formed in said rotatable member.

26. The device according to claim 25 wherein said channel has a trailing portion converging towards said axis of rotation in the direction of extension of said tape.

27. The device according to claim 23 wherein said orientation sensor is an inclinometer for providing a user discernible indication of said angular orientation relative to the horizontal.

28. The device according to claim 23 wherein said orientation sensor is an encoder for providing a user discernible indication of said angular orientation relative to a user determined orientation.

29. The device according to claim 23 and further comprising control circuitry with speech synthesizing capability for reading out at least one measurement associated with said measuring state.

30. The device according to claim 23 and further comprising one or more finger depressible soft feature keys each programmable with a user specified function.

31. The device according to claim 30 and further comprising data receiving means for downloading a user specified function from a host computer for assignment to a finger depressible soft feature key.

* * * * *